Patented Oct. 9, 1928.

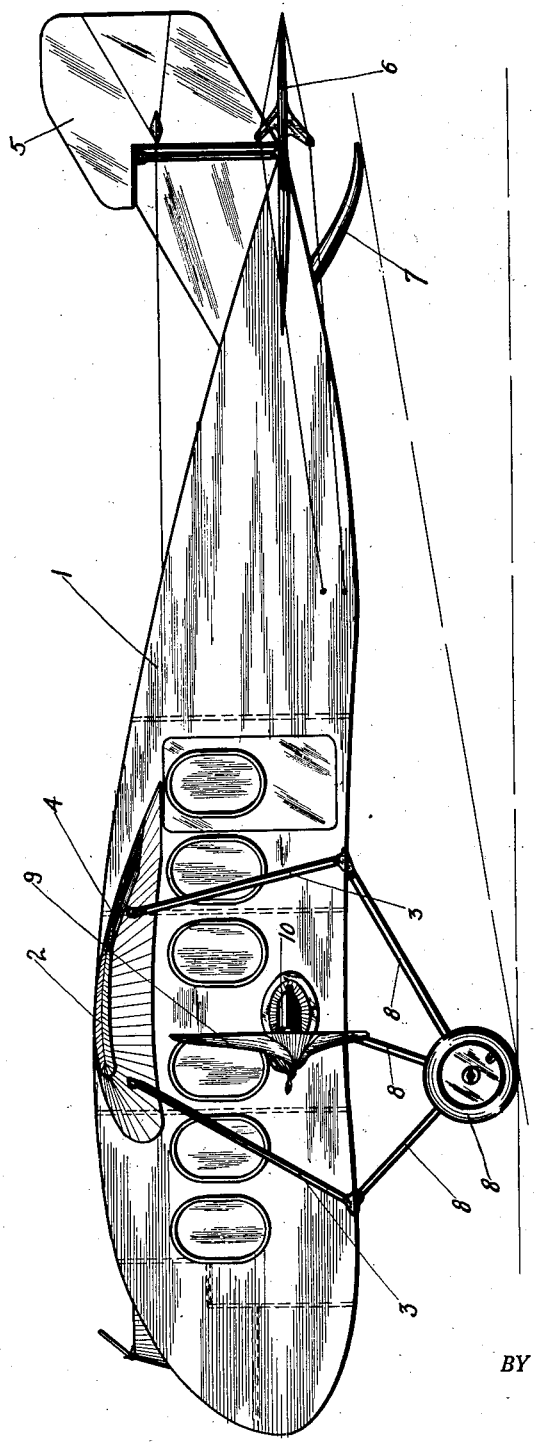

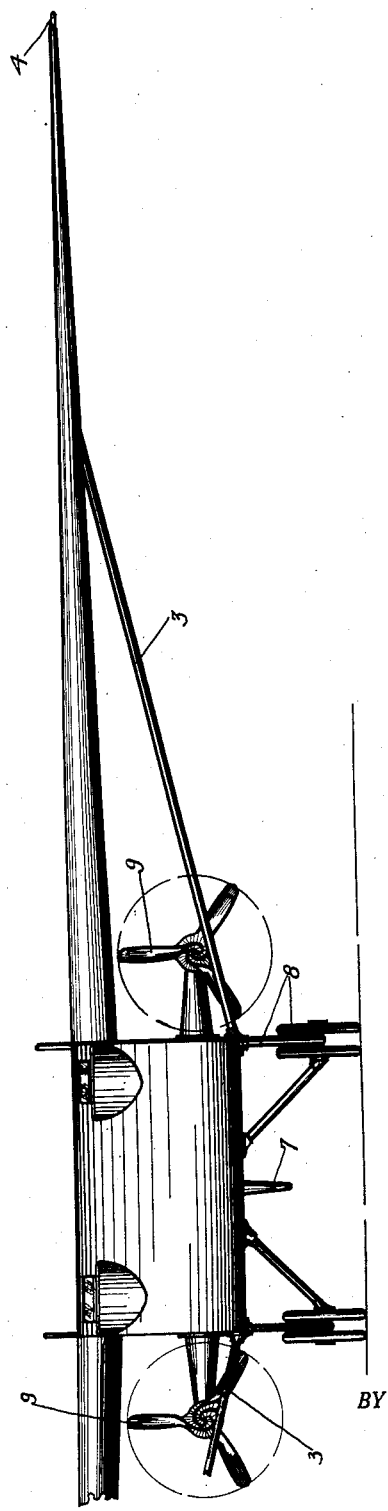

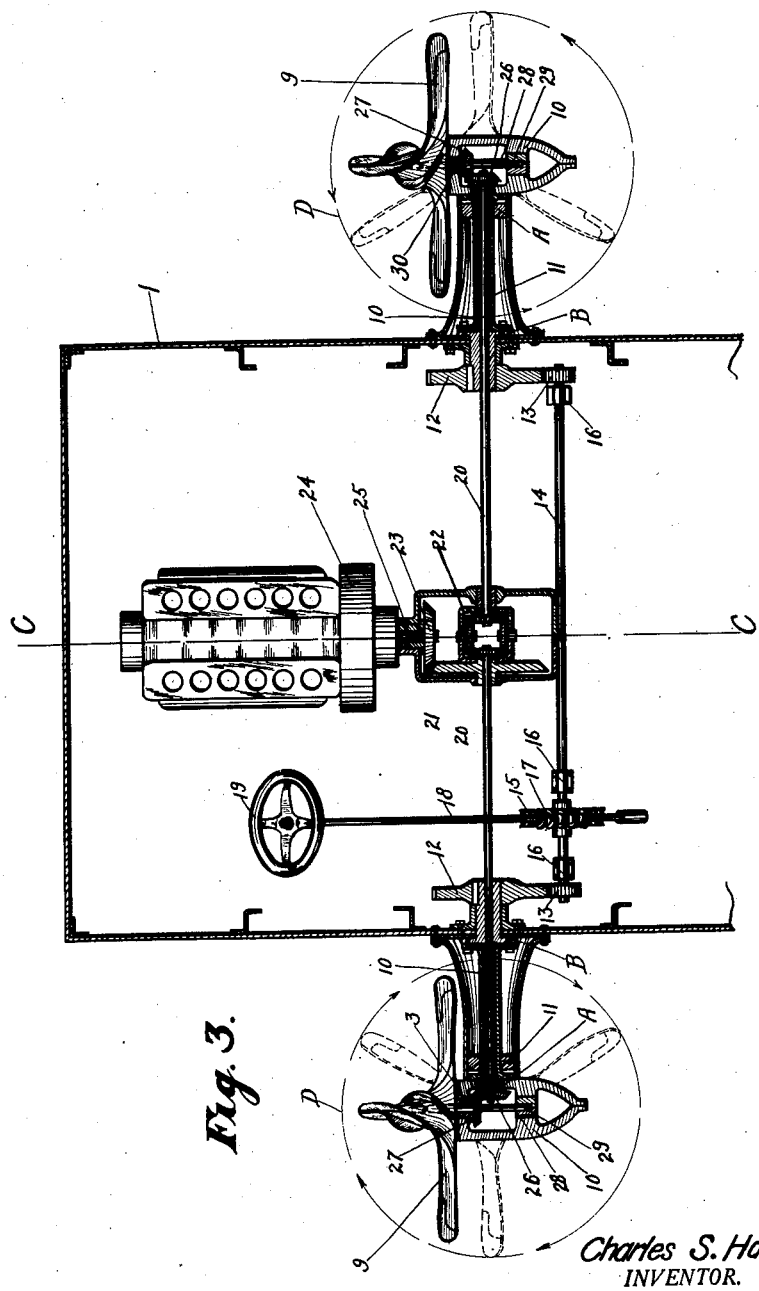

1,687,203

UNITED STATES PATENT OFFICE.

CHARLES S. HALL, OF LOS ANGELES, CALIFORNIA.

AIRCRAFT.

Application filed May 24, 1922. Serial No. 563,297.

My invention relates generally to an improvement in aircraft having a means of propulsion by propellers mounted upon revolvable frames arranged upon the side thereof, thus permitting the said propellers an unobstructed opportunity of producing an airstream paralleling the longitudinal line of flight of the aircraft.

Another object is to provide a means whereby the propellers thereof are mounted upon revolvable frames and so arranged that a thrust may be delivered at any angle upon a plane paralleling the line of flight.

Another object is to provide a means of rotating the said propellers from these revolvable frames by gearings so arranged that the said frames may be revolved while the propellers mounted thereon may be rotated.

Another object is to provide a construction of a body of an aircraft of such a shape, as shown, as will be aliformous with respect to the normal line of flight, so that the said body will produce a lifting effect in conjunction with the lifting effects produced by either or both the wings and the propellers so mounted and so controlled, as herein shown.

Another object is to provide a means whereby the thrust of the propeller on either side of the fuselage may be equally and simultaneously varied or reversed, thus affording a means of facilitating the landings by permitting the employment of the full power of the engine to stop the aircraft after the same comes in contact with the ground.

Another object is to provide a construction by which the revolving frames, upon which propellers are mounted, may be revolved transversely to the axillary motion of the propellers.

Having thus described generally the objects of my invention I will now describe the same with reference to the accompanying drawings which form an essential part of this specification.

Figure 1 is a side elevation of the assembled aircraft showing the propeller arrangement thereon.

Figure 2 is a front elevation showing the propellers arranged across the longitudinal center of the aircraft.

Figure 3 is a schematic view of the mechanical arrangements for controlling and pivoting, as well as rotating the propellers.

In carrying out my invention an aliferous aircraft body 1 is provided having wings 2 outwardly extending therefrom with bracing members 3 arranged thereon, and with ailrons 4, rudder 5, and elevators 6 arranged thereon, as shown in Figure 1, with tail-skid 7 and landing-gear 8 as shown in Figures 1 and 2. Propellers 9 as shown in all figures are arranged upon revolvable frames 10, as shown in Figures 1 and 2, and are arranged upon the side of the aircraft as shown in all figures. The said revolvable frames 10 are journaled within an outwardly extending and stationary framework 11 journaled on bearings "A" and "B" as shown in schematic view of Figure 3. To revolvable frame a spur-gear 12 is arranged controlled by spur-gear 13 arranged to shaft 14 upon which worm-gear 15 is rigidly attached, shaft 14 being rotated on bearings 16. Worm-gear 15 is driven manually by means of worm-drive 17 arranged on shaft 18 with steering wheel 19 rigidly attached thereto.

Within revolvable frame 10 is arranged shaft 20 to which gear 21 is attached and also to shaft 20 differential 22 is arranged. Said gear 20 is in operative relation with gear 23 journaled upon the said longitudinal axis of crank-shaft of engine 24 and rigidly attached to crank-shaft 25. Said shaft 20 outwardly extends into case 10 and to the outer end of said shaft 20 gear 26 is fixed in operative relation with gear 27 which is rigidly fixed upon propeller shaft 28, which is journaled on bearings 29 and 30, all shown in Figure 3.

Thus it will be seen that in operation, after engine 24 is started shaft 25 will rotate carrying with it gear 23 which rotates gear 21, and said gear 21 actuates differential and control shafts 20 and gears 26 thus equally and simultaneously revolving gears 27, which carry with them propellers 9 and from which sufficient thrust is derived to move the aircraft. By means of steering wheel 19 and through worm-drive 17 working upon worm-gear 15 and through spur-gears 12 and 13 revolving frames may be rotated whereby the said propellers 9 can be swung upon a horizontal axis in any direction so as to give a thrust upon any angle of a plane paralleling the longitudinal axis of the aircraft on line C—C as shown in Figure 3. The propellers 9 may be rotated clockwise and anticlockwise as indicated by arrows "D" as shown in Figure 3. Thus it will be seen that by means of the arrangement of the said propellers so mounted, conjointly with the lifting forces exerted by the planes or wings 2 and ailerons and rudders as shown in Figure 1, the aircraft may be induced to take the air with reduced ground speed and may be controlled in the usual manner while in flight. Also that the frames upon which the propellers are mounted may be reversed whereby the thrust derived from the propellers may move the aircraft in longitudinal flight through the air.

Now it will be understood that in making a landing propellers 9 can be so gradually inclined as to sustain the weight of the aircraft or even so gradually reverse its thrust that the aircraft can be quickly and completely stopped after the said craft comes in contact with the ground, thus avoiding high ground speeds, so dangerous and destructive to the aircraft.

Of course it will be understood that various changes in the relative arrangement, coordinization of parts may be made without departing from the spirit of this invention.

It will be further understood that this invention is equally adaptable to the aeroplane, the dirigible type of aircraft, or to aliferous aircraft.

Having thus described my invention in its preferred form although without limiting myself to this particular form or to the arrangement, collocation, or coordinization of parts, what I claim and for which I desire to secure Letters Patent are as follows:—

1. In an aircraft, the combination of an aliformous body disposed parallel to the normal line of flight, wings outwardly arranged upon said body, revolvable frames arranged to project outwardly from said body and manually revolvable propellers operatively mounted upon said frames, drive-shafts extending in line across said body and having geared connections at their outer ends with said propellers, differential gearing at the inner ends of said shafts operatively connected with a motor-shaft, a steering wheel, and geared connections between said wheel and said frames for revolving the latter.

2. In an aircraft, the combination of an aliformous body disposed parallel to the normal line of flight, wings on said body, revolvable frames arranged to project outwardly from said body, propellers operatively mounted upon said frames, drive-shafts extending in alinement across said body and through said frames with their outer ends in driving connection with said propellers, gears operatively connected to said frames, a shaft parallel with said drive-shafts carrying pinions meshing with said gears, a steering wheel having operative connections for rotating said last shaft to swing said frames in unison and means to differentially connect said drive-shafts.

In testimony whereof I have signed my name to this specification.

CHARLES S. HALL.